(12) United States Patent
Smith

(10) Patent No.: US 8,037,814 B1
(45) Date of Patent: Oct. 18, 2011

(54) METHOD OF STAGGERING BELTS IN A ROUND BALER

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/768,179

(22) Filed: Apr. 27, 2010

(51) Int. Cl.
 *B30B 5/06* (2006.01)
(52) U.S. Cl. ............................................. 100/88; 56/341
(58) Field of Classification Search .................... 100/87, 100/88; 56/341
See application file for complete search history.

(56) References Cited

U.S. PATENT DOCUMENTS

| | | |
|---|---|---|
| 4,399,746 A | 8/1983 | Viaud |
| 4,428,282 A * | 1/1984 | Anstey .......................... 100/88 |
| 4,648,239 A * | 3/1987 | Geiser et al. .................... 56/341 |
| 4,707,974 A | 11/1987 | Harthoorn |
| 5,224,329 A | 7/1993 | Viaud |
| 5,261,323 A | 11/1993 | Gunther et al. |
| 5,749,289 A | 5/1998 | Anderson et al. |
| 6,094,899 A | 8/2000 | Viesselmann |
| 2005/0028688 A1 | 2/2005 | Derscheid |
| 2005/0198935 A1 | 9/2005 | Johnson et al. |
| 2006/0243143 A1 | 11/2006 | Viaud |

FOREIGN PATENT DOCUMENTS

| | | |
|---|---|---|
| DE | 4102034 A1 | 7/1992 |
| FR | 2575362 A1 | 7/1986 |

* cited by examiner

*Primary Examiner* — Jimmy T Nguyen
(74) *Attorney, Agent, or Firm* — Patrick M. Sheldrake; Michael G. Harms

(57) ABSTRACT

An improved roll belt guide mechanism for directing movement of a plurality of side-by-side belts in a round baler wherein adjacent belts are staggered to create opening through which trash mass pass to prevent trash accumulation behind the belts. A pair of offsetting rolls is positioned between two guide rolls defining the normal belt path. The offsetting rolls are aligned on axes that are parallel to the normal guide roll axes and arranged so that one offsetting roll is positioned generally forward of the other. One or more belts are directed around the forward offset roll while the remainder of the belts is directed around the rearward offsetting roll. The alignment and separation of the offsetting rolls is configured to allow roll belts of equal lengths to be used regardless of routing around the offsetting rolls. Trash removal may be improved by the addition of an auger in the space between the offset belts to urge the trash laterally, generally along the length of the offsetting rolls.

16 Claims, 2 Drawing Sheets

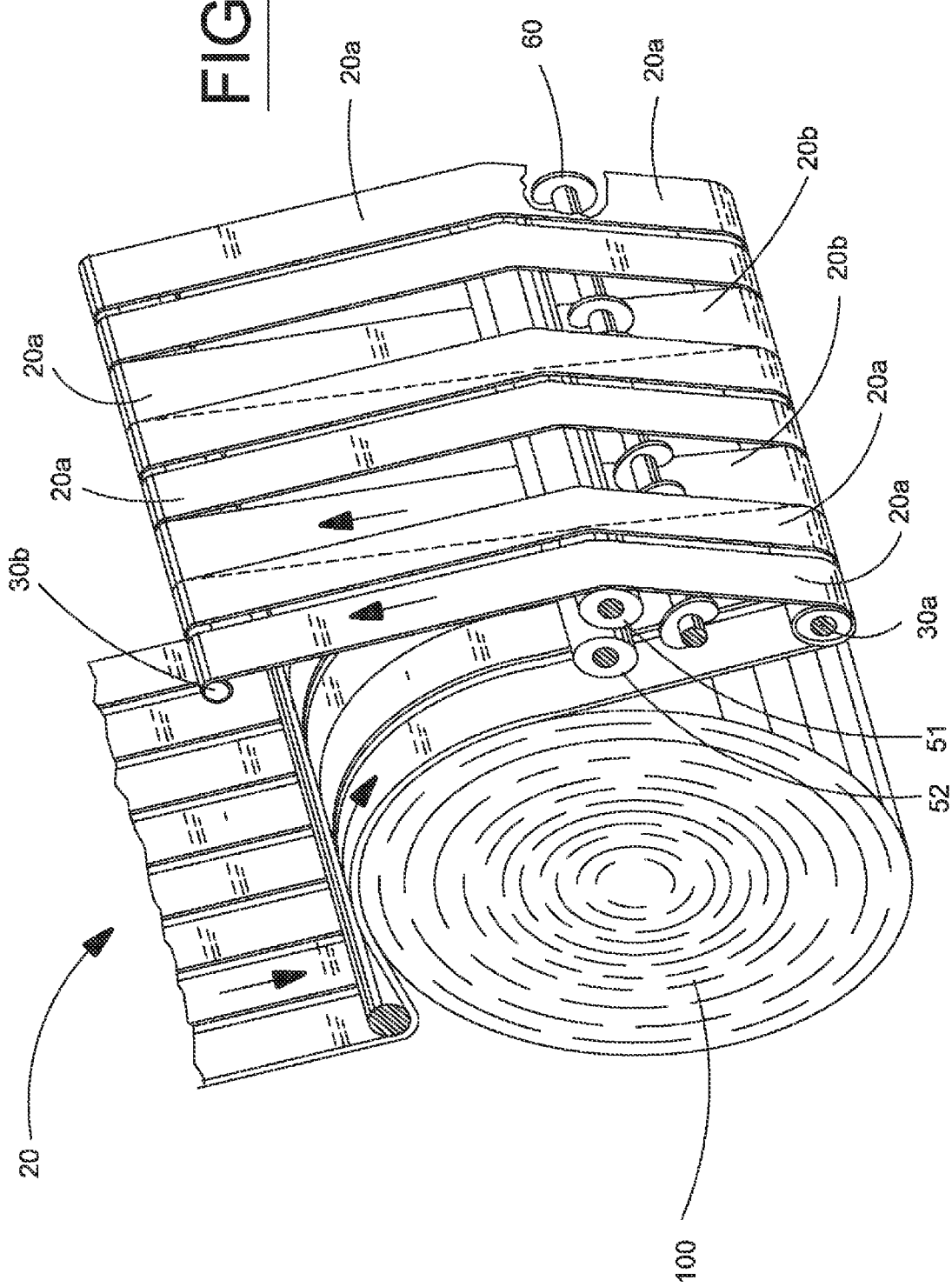

METHOD OF STAGGERING BELTS IN A ROUND BALER

BACKGROUND OF THE INVENTION

The present invention relates generally to agricultural round balers and more particularly to a method for staggering routing of adjacent side-by-side belts to reduce debris collection behind the belts.

Round balers have become quite prevalent for their capability of producing a conveniently sized cylindrical bale, very often automatically wrapped with a sheeting material such as net or film. Prior art round balers generally have a bale-forming chamber defined by a pair of spaced-apart side walls and a series of parallel belts trained around a series of rolls spanning between the side walls. A pick-up mechanism picks up crop material, such as hay, from the ground as the baler travels across the field, and is fed into a fixed or expandable chamber where it is rolled up to form a compact cylindrical hay package. While still inside the bale-forming chamber in its compacted form, the outer surface of the package is wrapped with twine or other wrapping material, such as film or net, prior to ejection of the wrapped bale from the chamber onto the ground for subsequent handling.

Round balers typically include a series of parallel rolls mounted between spaced sides, with a series of side-by-side belts trained about the rolls. The belts extend across a crop inlet defined between a pair of spaced rolls, and a pick-up mechanism feeds crop rearwardly to the crop inlet as the baler is moved along a windrow of crop material. As crop material is forced into the inlet, the belts deform inwardly into a rotating bale-forming chamber which compresses the crop material to form a round bale. The belts are trained about a tensioned take-up mechanism, which accommodates bale growth while maintaining tension on the belts. U.S. Pat. Nos. 4,870,812 and 5,367,865 issued to Jennings et al., disclose such prior art round balers having an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevents slack from occurring in the belts during expansion and contraction of the chamber.

In a round baler of this type, it is important that the belts remain in contact with the rolls in order to ensure proper belt tracking and advancement. In the past, it has been known for crop material to adhere to the belts as the belts exit the bale-forming chamber. This material, which is commonly known as "trash" because it is not incorporated into the bale, can build up on the rolls and adjacent the sides of the baler, causing belt driving and tracking problems which hinder the performance of the baler and which, in severe cases, may actually stop operation of the baler. Known methods for reducing trash build-up behind the belts is to stagger adjacent belts in order to create openings through which trash can pass and be directed to a desired location for recovery in the baler. The stagger in the belts is caused by providing an offset roll around which some of the belts travel and routing belts around different contact points on the rolls (e.g., some travel across the front, while others travel across the back of the roll). These known methods require the use of belts having differing lengths to accommodate the different belt paths, use of additional offset roll assemblies, and/or adjacent co-axial roller sections that rotate opposite directions, all of which increase manufacturing complexity of the baler.

It would be desirable to provide a mechanism for guiding the roll belts in a round baler which staggers adjacent belts thereby creating openings through which trash can be directed while retaining a relatively simple roll drive mechanism and allowing use of a plurality of equal-length drive belts. Additional advantages would be realized in a mechanism for guiding the roll belts in a round baler that minimizes bends in the belt path.

SUMMARY OF THE INVENTION

Accordingly, the present invention, in any of the embodiments described herein, may provide one or more of the following advantages:

It is an object of the present invention to provide a roll belt guide mechanism in an agricultural round baler that staggers adjacent belts to provide openings through which trash may pass to reduce trash build-up behind the belts.

It is a further object of the present invention to provide a staggered roll belt guide mechanism that enables adjacent belts to be staggered while using equal length belts.

It is a further object of the present invention to provide a roll belt guide mechanism that staggers adjacent belts using guide rolls in which co-axial rolls rotate in the same direction.

It is a further object of the present invention to provide a roll belt guide mechanism that staggers adjacent belts using guide rolls that create a space between adjacent belts in which additional trash direction apparatus may be positioned to further improve trash control in the baler.

It is a still further object of the present invention to provide a roll belt guide mechanism for staggering belts in an agricultural round baler that is durable in construction, inexpensive of manufacture, carefree of maintenance, easily assembled, and simple and effective to use.

These and other objects are achieved according to the instant invention by providing an improved roll belt guide mechanism for directing movement of a plurality of side-by-side belts in a round baler wherein adjacent belts are staggered to create opening through which trash mass pass to prevent trash accumulation behind the belts. A pair of offsetting rolls is positioned between two guide rolls defining the normal belt path. The offsetting rolls are aligned on axes that are parallel to the normal guide roll axes and arranged so that one offsetting roll is positioned generally forward of the other. One or more belts are directed around the forward offset roll while the remainder of the belts is directed around the rearward offsetting roll. The alignment and separation of the offsetting rolls is configured to allow roll belts of equal lengths to be used regardless of routing around the offsetting rolls. Trash removal may be improved by the addition of an auger in the space between the offset belts to urge the trash laterally, generally along the length of the offsetting rolls.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial perspective view of one embodiment of the offsetting rolls and staggered side of the present invention.

DESCRIPTION OF THE PREFERRED EMBODIMENT(S)

Figure 1:
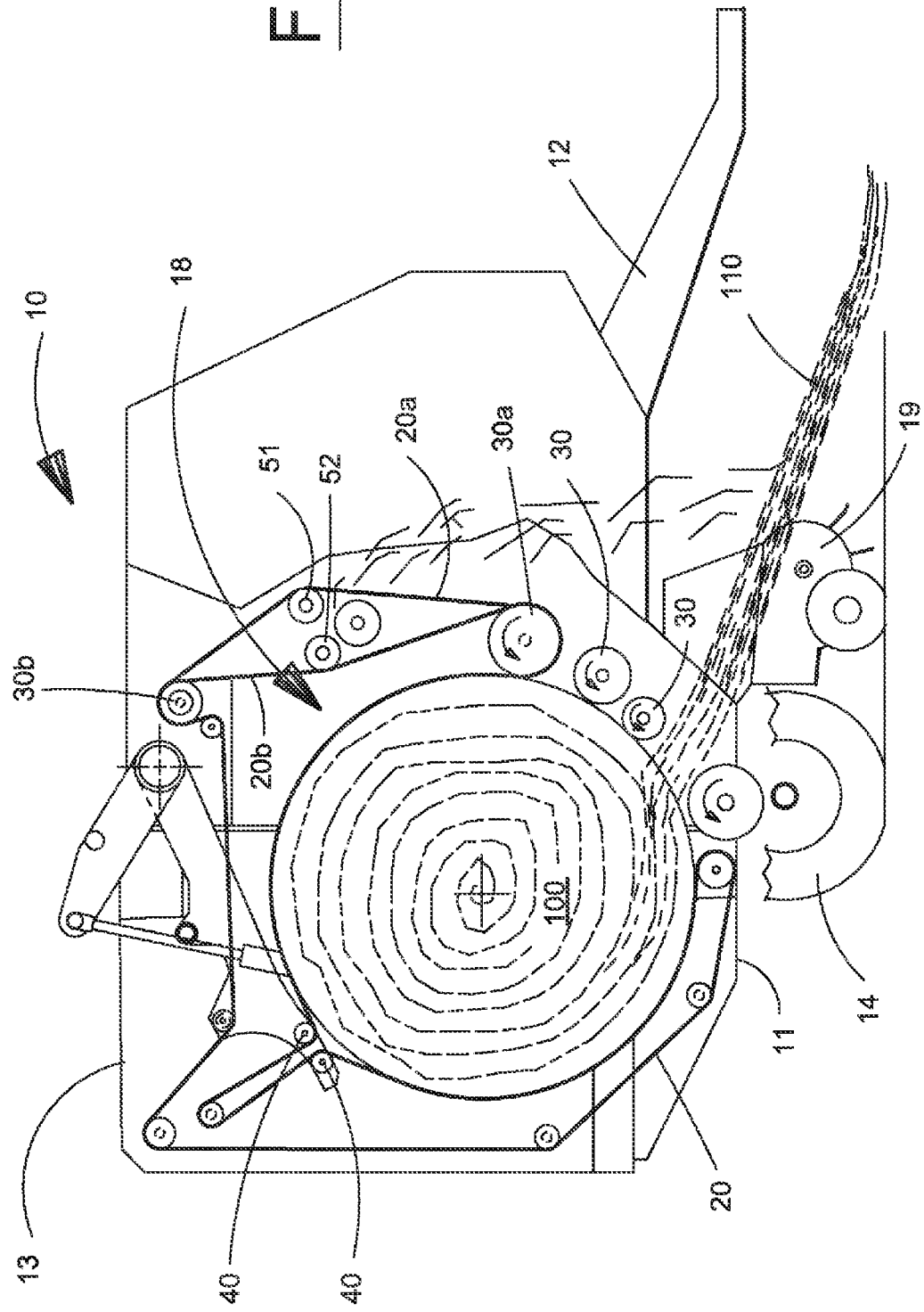
FIG. 1 is a side view of a typical agricultural round baler on which the present invention is useful.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring to FIG. 1, a generally well-known round baler 10 is shown to comprise a main frame 11 terminating forwardly in a tongue 12 and rearwardly, slightly beyond a transverse axle to which a pair of wheels 14 (only one shown) are mounted, thus forming a wheel supported main frame. The main frame 11 supports a series of side-by-side movable belts 20, transversely arranged fixed rolls 30, and belt take-up rolls 40 which together with a pair of generally parallel and opposing sidewalls establish an expandable bale-forming chamber 18. One or more of the fixed rolls are powered to move the belts in a generally clockwise direction around the bale forming chamber as shown which, in conjunction with rotation of the fixed rolls 30, causes the incoming crop material to be coiled in a generally clockwise direction around the bale chamber 18 to form the bale. Cut crop material 110 is picked up by transverse pickup 19 and fed into bale-forming chamber 18 where it is formed into a cylindrically shaped bale 100 by movement of the belts 20 and rolls 30. A completed bale 100, that is one that has reached a desired diameter, is then wrapped with twine or a wrapping material to maintain the bale shape after ejection from the baler. Upon completion of the wrapping process, the tailgate 13 pivots upwardly to open the rearward portion of the bale forming chamber 18 and the bale 100 is ejected onto the ground.

Referring now to FIGS. 1 and 2, a belt staggering arrangement comprising a pair of belt offsetting rolls, including a forward offsetting roll 51 and a rearward offsetting roll 52 of the present invention is shown. In the embodiment shown, the offsetting rolls 51, 52 are positioned generally forward of the bale forming chamber 18 generally in line with the normal return path of the belts 20 on the forward side of the bale forming chamber 18 between rolls 30a and 30b. One or more of the belts 20 are routed around the forward offsetting roll 51 while the remaining belts are routed around the rearward offsetting roll 52 creating a staggered belt arrangement transverse to the bale chamber. The staggering rolls are arranged such that the offset between the portion of each stagger engaging the belts and the normal line of the belts if no stagger rolls were present is the same so that the belt deflection is the same, regardless of the path of the belt around the stagger rolls. Crop material adhering to the surfaces of the belts is allowed to pass through the openings created by the staggered belts and directed to the crop pick-up 19 below by shrouds, guides, or the like where it may then be incorporated into the incoming crop material stream. Flow of trash may be improved by a trash conveyor, preferably an auger 60, situated in the space between the offset belts 20a, 20b and configured to urge material laterally toward the transverse center of the baler. Auger 60 is arranged generally parallel to the rolls 30 and driven by the roll drive existing in the baler in a conventional manner. The arrangement of the staggered belts and trash conveying auger 60 reduces trash accumulation at the outboard ends of the rolls 30 where roll drive mechanisms are typically situated.

In other embodiments, the stagger rolls 51, 52 may be positioned in other locations relative to the bale chamber. Similar belt clearing performance is obtained by positioning the stagger rolls 51, 52 between two adjacent guide rolls 30. One such alternate position is rearward in the tailgate area; however, trash removed using this arrangement is discharged to the ground rather than incorporated into the incoming crop. Other locations are envisioned within the scope of the present invention.

The position of the offsetting rolls 51, 52 relative to rolls 30a, 30b is such that the length of the belt span (shown as 20a and 20b) between rolls 30a and 30b is equal regardless of the belt path. Equidistant belt paths 20a, 20b allow all of the side-by-side belts 20 to be the same length thereby streamlining manufacturing efficiency. The arrangement of the offsetting rolls 51, 52 also enables all belts engaging the rolls to move in the same direction so that each offsetting roll can be configured as a single roll rotating on a single axis. Other known alternatives require that offset rolls be configured for adjacent belts moving in opposite relative directions, typically requiring multiple counter-rotating roll portions co-axially arranged. The arrangement of the offsetting rolls also imposes minimal belt deflection from the normal belt return path. Other known alternatives for staggered belt designs impose additional belt bends, some in excess of 90 degrees around an offsetting roll. By maintaining belt bend paths similar to those existing in a non-staggered belt baler, the present invention minimally impacts belt life, if at all.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An agricultural round baler comprising:
    a ground-supported main frame adapted for movement in a forward direction of travel;
    an expandable bale forming chamber defined in a space between opposing side walls by a plurality of side-by-side belts trained around a plurality of spaced-apart elongate guide rolls extending transverse to said frame, said plurality of guide rolls having at least a first guide roll and an adjacent second guide roll configured with said plurality of belts spanning therebetween, the first guide roll positioned above the second guide roll; and
    a belt staggering arrangement having first and second belt staggering rolls disposed outside of said bale forming chamber and extending transverse to said frame, said first and second stagger rolls positioned between said first guide roll and said second guide roll, said first stagger roll offset in a first offset direction from a belt line extending between said first and second guide rolls, said second stagger roll being offset in a direction opposite said first offset direction, at least one of said plurality of belts trained around said first stagger roll following a first belt offset path having a first belt travel length and at least one other of said plurality of belts trained around said second stagger roll following a second offset path having a second travel length wherein a length of belt in said first and said second offset paths spanning between the first and second guide rolls is substantially equal, and wherein said at least one of the plurality of belts on the first offset path and said at least one of the plurality of belts on the second offset path do not travel through a longitudinal gap between the stagger rolls and do not travel directly from the first stagger roll to the second stagger roll, whereby debris is allowed to pass through the space between the first and second offset paths.

2. The baler of claim 1, wherein said belts trained in said first belt offset path move in the same direction when contacting said first stagger roll and said belts trained in said second offset path move in the same direction when contacting said second stagger roll.

3. The baler of claim 1, wherein said first stagger roll and said second stagger roll are single rolls, wherein belts either contact the first or second stagger roll.

4. The baler of claim 2, further comprising a trash conveyor disposed in a space between said first offset path and said second offset path, said trash conveyor configured to urge crop material entering said space toward a discharge area and wherein said first stagger roll and said second stagger roll are single rolls.

5. In an agricultural round baler having a ground-supported main frame configured for movement in a forward direction of travel, an expandable bale forming chamber defined in a space between opposing side walls by a plurality of side-by-side belts trained around a plurality of elongate guide rolls extending transverse to the frame, and a crop pickup for lifting crop material from the ground and conveying the crop material to the bale forming chamber, the improvement comprising:
 a first guide roll and an adjacent second guide roll configured with said plurality of belts spanning therebetween, the first guide roll positioned above the second guide roll; and
 a belt staggering arrangement disposed outside of said bale forming chamber between said first guide roll and said second guide roll, said belt staggering arrangement having a first stagger roll and a spaced apart second stagger roll, at least one of said plurality of belts trained around said first stagger roll following a first offset path and at least one of said plurality of belts trained around said second stagger roll following a second offset path wherein the distance of travel of the belt along said first and said second offset paths running from the first to second guide rolls is generally equal, and wherein said at least one of the plurality of belts on the first offset path and said at least one of the plurality of belts on the second offset path do not travel through a longitudinal gap between the stagger rolls and do not travel directly from the first stagger roll to the second stagger roll, whereby debris is allowed to pass through the space between the first and second offset paths.

6. The improvement of claim 5, wherein said belt staggering arrangement creates at least one stagger opening through which crop debris adhering to the plurality of belts may be dislodged and directed toward the crop pick up.

7. The improvement of claim 6, wherein said belts trained in said first belt offset path move in the same direction when contacting said first stagger roll and said belts trained in said second offset path move in the same direction when contacting said second stagger roll.

8. The improvement of claim 7, wherein said wherein belts either contact the first or second stagger roll.

9. The improvement of claim 6, further comprising a trash conveyor disposed in a space between said first offset path and said second offset path vertically below said stagger rolls, said trash conveyor configured to urge crop material entering said space toward said at least one stagger opening.

10. The improvement of claim 9, wherein said trash conveyor is an auger.

11. A method of removing debris from a plurality of side-by-side belts trained about a plurality of spaced-apart guide rollers in an agricultural round baler and directing the debris to an infeed of crop material comprising the steps of:
 providing a first guide roll and an adjacent second guide roll configured with said plurality of belts spanning therebetween, the first guide roll positioned above the second guide roll;
 providing a belt staggering arrangement disposed outside of the bale forming chamber between the first guide roll and the second guide roll and generally above the crop infeed, the belt staging arrangement having a first stagger roll and a spaced-apart second stagger roll;
 training at least a first of the plurality of belts around the first stagger roll creating a first belt offset path between the first and second guide rolls; and
 training at least a second of the plurality of belts around the second stagger roll creating a second belt offset path between the first and second guide rolls, lengths of belt spanning between the first and second guide roll on both the first and second belt offset paths are generally equal, wherein said first of the plurality of belts on the first belt offset path and said second of the plurality of belts on the second belt offset path do not travel through a longitudinal gap between the stagger rolls and do not travel directly from the first stagger roll to the second stagger roll, whereby debris is allowed to pass though the space between the first and second belt offset paths.

12. The method of claim 11, wherein the belt staggering arrangement creates at least one stagger opening through which crop debris adhering to the plurality of belts may be dislodged and directed toward the crop infeed.

13. The method of claim 12, wherein the belts trained in the first belt offset path move in the same direction when contacting the first stagger roll and the belts trained in the second offset path move in the same direction when contacting the second stagger roll.

14. The method of claim 11, wherein the first stagger roll and the second stagger roll are each single rolls, wherein each belt only contacts the first or second stagger roll.

15. The method of claim 13, further comprising the step of:
 providing a trash conveyor disposed in a space between the first offset path and the second offset path, the trash conveyor configured to urge crop material entering said space toward a discharge area;
 operating the trash conveyor during baler operation thereby causing crop debris to be urged toward the discharge area.

16. The method of claim 15, wherein the trash conveyor is an auger.

* * * * *